United States Patent [19]

Rush et al.

[11] Patent Number: 4,654,942
[45] Date of Patent: * Apr. 7, 1987

[54] METHOD OF MAKING A BRANCHED HOSE CONSTRUCTION

[75] Inventors: James B. Rush, Waynesville; James S. Bryan, Clyde; Jonas L. Gunter, Canton; Guy W. Dillard, Sylva; Roger D. Meadows, Waynesville; Pearison W. Henry, Sylva, all of N.C.

[73] Assignee: Dayco Products, Inc., Dayton, Ohio

[*] Notice: The portion of the term of this patent subsequent to Jan. 20, 2004 has been disclaimed.

[21] Appl. No.: 780,517

[22] Filed: Sep. 26, 1985

Related U.S. Application Data

[63] Continuation-in-part of Ser. No. 709,962, Mar. 8, 1985.

[51] Int. Cl.⁴ .............................................. B21D 53/00
[52] U.S. Cl. .................................. 29/157 T; 285/197; 285/208
[58] Field of Search .......................... 29/157 R, 157 T; 285/158, 161, 197, 200, 206, 208

[56] References Cited

U.S. PATENT DOCUMENTS

| | | | |
|---|---|---|---|
| 1,341,828 | 6/1920 | Volckhausen | 285/200 X |
| 3,342,088 | 9/1967 | Smith | 29/157 R X |
| 3,620,245 | 11/1971 | Finney et al. | 29/157 R X |
| 3,694,009 | 9/1972 | Phillips | 285/197 |

FOREIGN PATENT DOCUMENTS

| | | | |
|---|---|---|---|
| 480172 | 6/1916 | France | 285/200 |
| 849048 | 11/1939 | France | 285/197 |

OTHER PUBLICATIONS

Pages 12–14 of the Dec. 1983 issue of Automotive Elastomers and Design.

*Primary Examiner*—Howard N. Goldberg
*Assistant Examiner*—Ronald S. Wallace
*Attorney, Agent, or Firm*—Joseph V. Tassone

[57] ABSTRACT

A method of making a branched hose construction is provided and comprises the steps of providing a first tubular member having opposed ends, providing a second tubular member having opposed ends, forming the first tubular member to have an opening therein intermediate the opposed ends thereof, providing a joint construction that comprises a tubular insert having opposed ends, joining one of the ends of the second tubular member to the opening by having one end of the tubular insert disposed through the opening and the other end thereof interconnected to the one end of the second tubular member whereby the tubular members are in fluid communication with each other through the tubular insert and the second tubular member branches outwardly from the first tubular member, forming the joint construction to further comprise a washer-like member, telescoping the washer-like member on the tubular insert, and mechanically clamping the one tubular member between the washer-like member and the one end of the tubular insert completely around the opening thereof.

10 Claims, 25 Drawing Figures

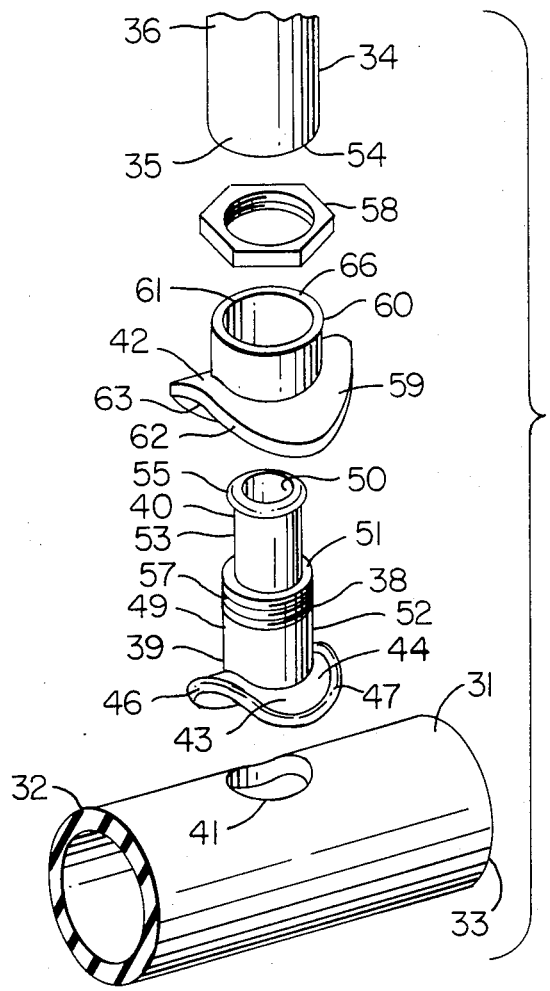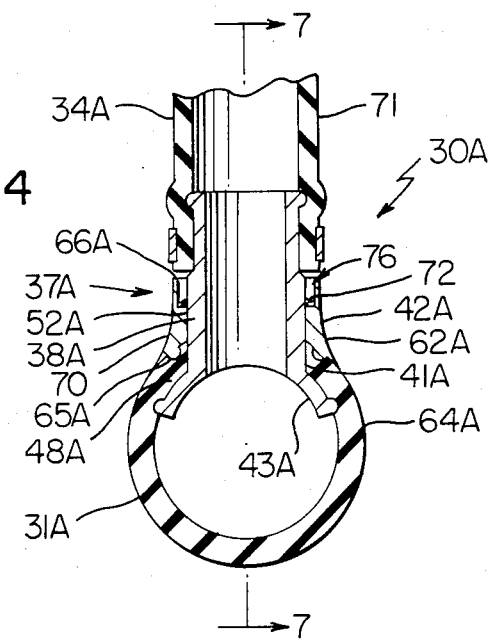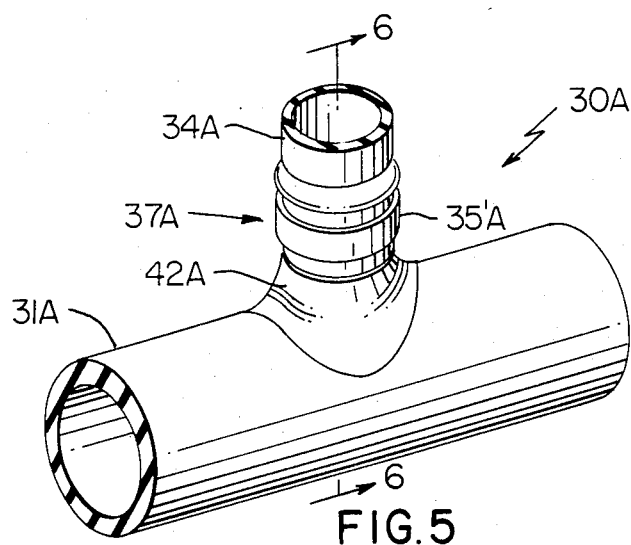

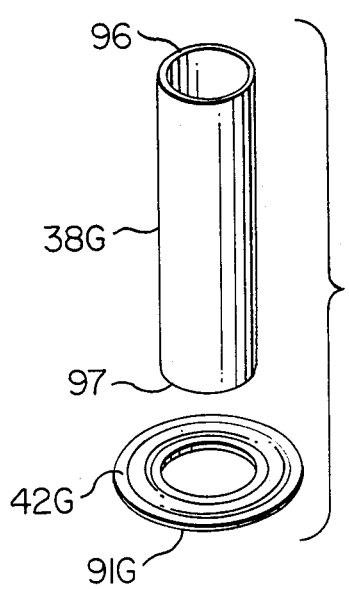
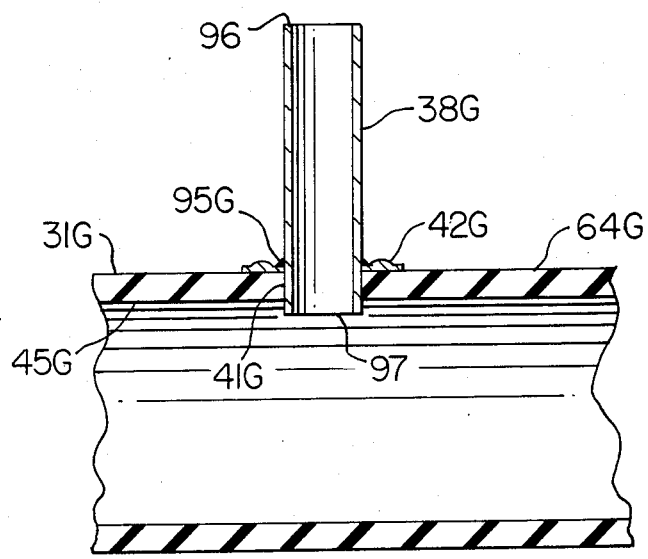
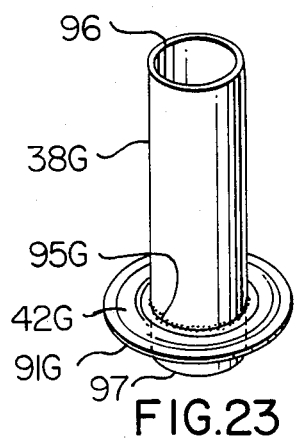
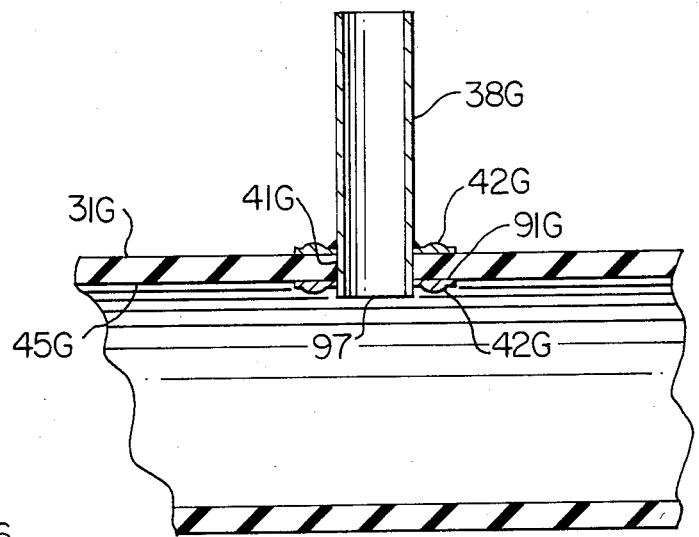
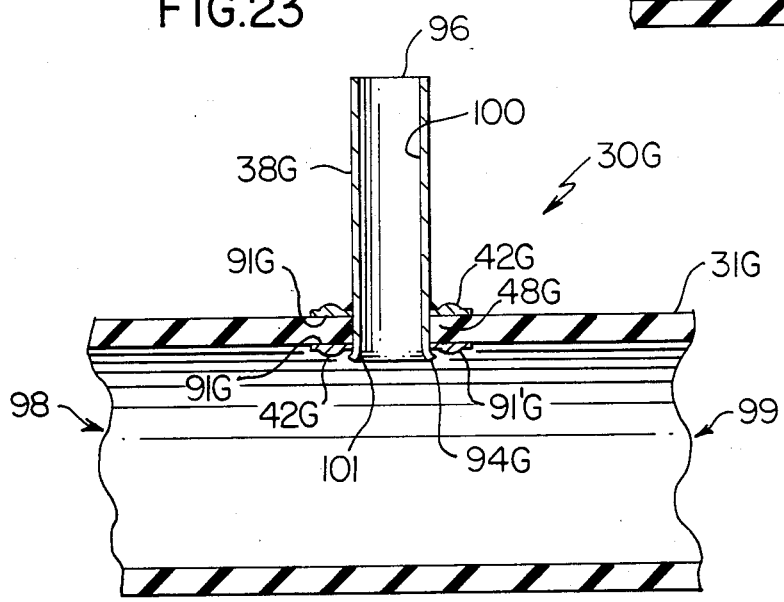

METHOD OF MAKING A BRANCHED HOSE CONSTRUCTION

CROSS-REFERENCE TO A RELATED PATENT APPLICATION

This patent application is a continuation-in-part patent application of its copending parent patent application, Ser. No. 709,962, filed Mar. 8, 1985 and is assigned to the same assignee thereof.

BACKGROUND OF THE INVENTION

1. Field of the Invention

This invention relates to an improved method of making a branched hose construction.

2. Prior Art Statement

It is known to provide a method of making a branched hose construction that comprises the steps of providing a first tubular member having opposed ends, providing a second tubular member having opposed ends, forming the first tubular member to have an opening therein intermediate the opposed ends thereof, providing a joint construction that comprises a tubular insert having opposed ends, and joining one of the ends of the second tubular member to the opening by having one end of the tubular insert disposed through the opening and the other end thereof interconnected to the one end of the second tubular member whereby the tubular members are in fluid communication with each other through the tubular insert and the second tubular member branches outwardly from the first tubular member. For example, see FIGS. 2 and 3 of the magazine article entitled "The Automotive Spouted Hose: An Opportunity For Improved Design Flexibility" in the December 1983 issue of *Automotive Elastomers and Design* on pages 12-14 thereof.

A prior known branched hose construction of the type as set forth above has the joint construction comprising securing means securing the washer-like member to the tubular insert in the clamping relation thereof. The first tubular member has an internal surface means. The annular flange has a surface means facing and engaging the internal surface means of the first tubular member and is provided with an inner peripheral means and an outer peripheral means. The surface means of the annular flange has annular projection means thereon that digs into the internal surface means of the first tubular member around the opening thereof. The first tubular member has an external surface means. The washer-like member has a surface means facing and engaging the external surface means of the first tubular member and is provided with an inner peripheral means and an outer peripheral means. The surface means of the washer-like member has annular projection means thereon that digs into the external surface means of the first tubular member around the opening thereof. For example, see the U.S. Patent to Volckhausen, No. 1,341,828 and the French Patent to Henderson, No. 480,172.

For other similar branched hose constructions, see the U.S. Patent to Phillips, No. 3,694,009; Canadian Pat. No. 839,603; French Pat. No. 2,518,699 and French Pat. No. 849,048.

SUMMARY OF THE INVENTION

It is one feature of this invention to provide an improved method of making a branched hose construction wherein a new joint construction of this invention is utilized to join one end of a tubular member to an opening formed in another tubular member intermediate the opposed ends thereof so that the two tubular members are joined together in a branched relation thereof.

For example, it was found according to the teachings of this invention, that a tubular insert can have one end thereof disposed through an opening of a tubular member and thereafter have a washer-like member that is telescopically disposed on said tubular insert cooperate with the one end of the tubular insert in mechanically clamping an annular portion of the tubular member therebetween completely around the opening thereof to provide an effective connection thereto which permits another tubular member to be interconnected to the other end of the tubular insert whereby the tubular members are secured together in a branched relation thereof.

For example, one embodiment of this invention provides a method of making a branched hose construction comprising the steps of providing a first tubular member having opposed ends, providing a second tubular member having opposed ends, forming the first tubular member to have an opening therein intermediate the opposed ends thereof, providing a joint construction that comprises a tubular insert having opposed ends, joining one of the ends of the second tubular member to the opening by having one end of the tubular insert disposed through the opening and the other end thereof interconnected to the one end of the second tubular member whereby the tubular members are in fluid communication with each other through the tubular insert and the second tubular member branches outwardly from the first tubular member, forming the joint construction to further comprise a washer-like member, telescoping the washer-like member on the tubular insert, mechanically clamping the one tubular member between the washer-like member and the one end of the tubular insert completely around the opening thereof, securing the washer-like member to the tubular insert, and forming the one end of the tubular insert with an annular flange, the step of forming the one end of the tubular insert with an annular flange taking place after the step of disposing the one end of the tubular insert through the opening of the one tubular member.

Accordingly, it is an object of this invention to provide an improved method of making a branched hose construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 4 is a fragmentary, exploded perspective view of the branched hose construction of FIG. 1.

FIG. 5 is a view similar to FIG. 1 and illustrates another embodiment of the improved branched hose construction of this invention.

FIG. 6 is an enlarged, fragmentary cross-sectional view taken on line 6—6 of FIG. 5.

FIG. 21 is a view similar to FIG. 3 and illustrates the completed hose construction made by the method of this invention that is illustrated in FIGS. 22–25.

FIG. 22 is an exploded perspective view of part of another embodiment of the joint construction of this invention.

FIG. 23 is a perspective view of the parts of FIG. 22 assembled together.

FIG. 24 is a fragmentary cross-sectional view illustrating the arrangement of FIG. 23 assembled in an opening of a tubular member.

FIG. 25 is a view similar to FIG. 24 and illustrates another step in the method of making the branched hose construction of FIG. 21.

DESCRIPTION OF THE PREFERRED EMBODIMENTS

Figure 1:
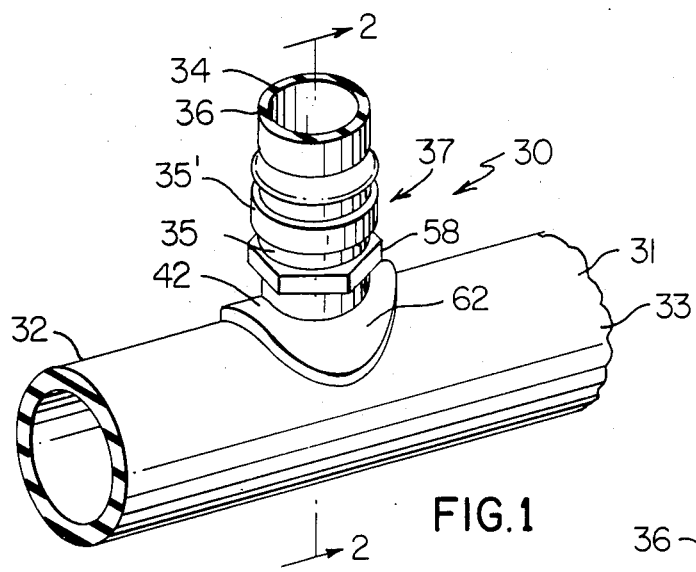
FIG. 1 is a fragmentary perspective view of one embodiment of the improved branched hose construction of this invention.

While the various features of this invention are hereinafter illustrated and described as being particularly adapted to provide a branched hose construction for automotive use, it is to be understood that the various features of this invention can be utilized singly or in various combinations thereof to provide a branched hose construction for other uses as desired.

Therefore, this invention is not to be limited to only the embodiments illustrated in the drawings, because the drawings are merely utilized to illustrate some of the wide variety of uses of this invention.

Referring now to FIGS. 1–4, one embodiment of the improved branched hose construction of this invention is generally indicated by the reference numeral 30 and comprises a first tubular member 31 provided with opposed ends 32 and 33 which can extend to any desired length as is obvious, a second tubular member 34 provided with opposed ends 35 and 36 which can also extend to any desired length, and a joint construction of this invention that is generally indicated by the reference numeral 37 and comprising a tubular insert 38 provided with opposed ends 39 and 40 that can extend to any desired length and joining the one end 35 of the second tubular member 34 to an opening 41 formed in the first tubular member 31 intermediate the opposed ends 32 and 33 thereof by having the one end 39 of the tubular insert 38 disposed through the opening 41 and the other end 40 thereof interconnected to the one end 35 of the second tubular member 34 whereby the tubular members 31 and 34 are in fluid communication with each other through the tubular insert 38 and the second tubular member 34 branches outwardly from the first tubular member 31 as illustrated, the joint construction 37 also comprising a washer-like member 42 telescoped on the tubular insert 38 and cooperating with the one end 39 of the tubular insert 38 in mechanically clamping the one tubular member 31 therebetween completely around the opening 41 thereof in a manner hereinafter set forth whereby it can readily be seen that this invention provides a unique method of forming the unique branched hose construction 30 illustrated in FIGS. 1–4.

While the tubular members 31 and 34 can be formed of any suitable material to comprise flexible hoses for transporting hot, pressurized coolant for an automotive engine with the parts 38 and 42 of the joint construction 37 of this invention also being formed of any suitable material for this purpose, such as metallic material, plastic material, etc., it is to be understood that the materials for the tubular members 31 and 34 and the joint construction 37 can be so selected as to be compatible with a particular fluid system utilizing the same. Therefore, the aforementioned magazine article "The Automotive Spouted Hose: An Opportunity For Improved Design Flexibility" appearing on pages 12–14 of the December 1983 issue of *Automotive Elastomers And Design* is being incorporated into this disclosure by this reference thereto as the same sets forth specific materials for the tubular members and the joint construction for the particular automotive uses thereof, whereby a further description of the materials and uses of the various embodiments of the branched hose construction of this invention need not be further described.

Figure 2:
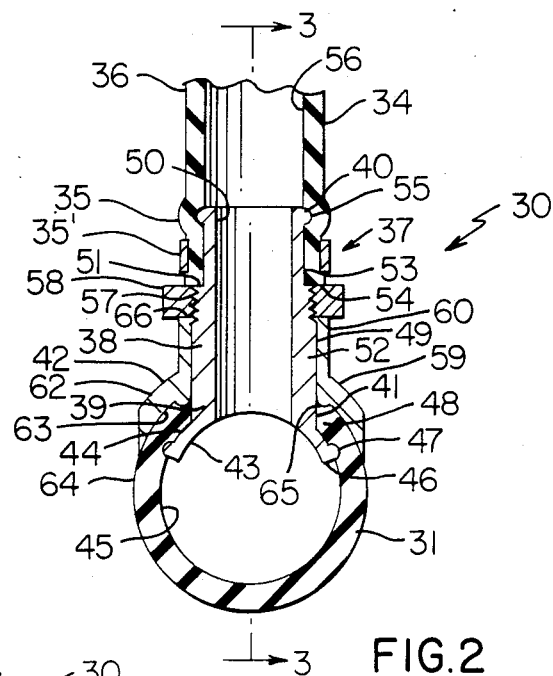
FIG. 2 is an enlarged, fragmentary cross-sectional view taken on line 2—2 of FIG. 1.

The tubular insert 38 of this invention has the one end 39 thereof defined as an annular flange 43 that has an outer surface means 44 which is adapted to engage and mate with the internal peripheral surface 45 of the tubular member 31 that defines a substantially circular transverse cross-sectional configuration as illustrated in FIG. 2 whereby the annular flange 43 of the tubular insert 38 is substantially saddle-shaped as illustrated in FIG. 4 and has an outer periphery 46 which is larger than the diameter of the substantially circular opening 41 that is formed in the tubular member 31.

Figure 3:
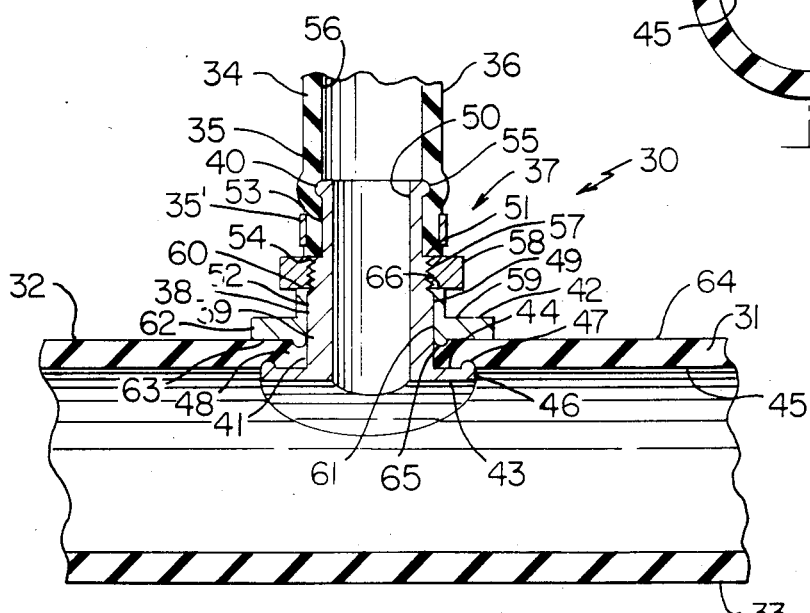
FIG. 3 is a fragmentary cross-sectional view taken on line 3—3 of FIG. 2.

However, when assembling the tubular insert 38 to the tubular member 31, the annular flange 39 can be forced through the opening 41 in a manner that is similar to a button being forced through a cooperating buttonhole because the tubular member 31 can be stretched and flexed to permit the annular flange 43 to be readily worked through the opening 41 and thereby have the surface means 44 thereof disposed against the internal surface means 45 of the tubular member 31 as illustrated in FIGS. 2 and 3.

The outer periphery 46 of the annular flange 43 of the tubular insert 38 of this invention can be provided with an annular projection means 47 that extends outwardly from the surface means 44 thereof and is adapted to dig into the internal surface means 45 of the tubular member 31 to not only more firmly hold an annular portion 48 of the tubular member 31 that surrounds the opening 41 thereof between the annular flange 38 and the washer-like member 42 in a manner hereinafter set forth so as to prevent the joint construction 37 from working out of the opening 41 of the tubular member 31, but also to effectively seal the tubular insert 38 to the internal peripheral surface 45 of the tubular member 31 so as to provide a substantially fluid-tight joint therewith.

The tubular insert 38 of this invention has a stepped substantially cylindrical body portion 49 that extends outwardly from the annular flange 43 and has a cylindrical opening 50 passing therethrough so as to fluidly interconnect the interior of the tubular member 31 to the tubular member 34.

The stepped body portion 49 of the tubular insert 38 of this invention defines an annular shoulder 51 between a larger body portion 52 thereof and a smaller body portion 53 thereof which is adapted to be telescopically received within the end 35 of the tubular member 34 as illustrated and have the end surface 54 thereof abut against the shoulder 51 as illustrated in FIGS. 2 and 3.

If desired, the end 40 of the tubular insert 38 of this invention can be provided with an annular projection means 55 that will dig into or be formed into the internal peripheral surface 56 of the tubular member 34 to assist in the securement of the end 35 thereof on the end 40 of the tubular insert 38.

In addition, a suitable and conventional annular clamping means 35' can be disposed around the end 35 of the tubular member 34 intermediate the shoulder 51 and annular bead 55 on the tubular member 38 to assist in holding the end 35 of the tubular member 34 on the end 40 of the tubular insert 38.

However, it is to be understood that other means can be utilized to secure the end 35 of the tubular member 34 on the end 40 of the tubular insert 38. For example, the same may be clamped, crimped, cemented, etc., onto the end 40 as desired. Also, while the end 35 of the tubular member 34 is disposed in telescoping relation on the end 40 of the insert 38, it is to be understood that the end 40 could be so constructed and arranged that the end 35 of the tubular member 34 could be secured internally in the opening 50 thereof in any manner that is well known in the art.

The enlarged body portion 52 of the tubular insert 38 of this invention is formed with external threads 57 beginning at the shoulder 51 thereof for threadedly receiving an internally threaded nut 58 for compacting the washer-like member 42 toward the annular flange 43 of the tubular insert 38 in a manner hereinafter set forth as well as for holding the washer-like member 42 in its compacting relation.

The washer-like member 42, in a manner similar to the tubular insert 38, has opposed ends 59 and 60 through which a cylindrical opening 61 extends so that the washer-like member 42 can be telescopically disposed onto the body portion 52 of the tubular insert 38 and be axially movable thereon.

The end 59 of the washer-like member 42 comprises an annular flange 62 having a surface means 63 which is adapted to engage and mate with the external peripheral surface means 64 of the tubular member 31 which also defines a substantially circular transverse cross-sectional configuration thereof whereby the annular flange 62 of the washer-like member 42 is also substantially saddle-shaped as illustrated in FIGS. 1-4.

If desired, the annular flange 62 of the washer-like member 42 can be provided with an annular projection means 65 that extends outwardly from the surface means 63 thereof to dig into the external peripheral surface 64 of the portion 48 of the tubular member 31 that is disposed between the annular flanges 43 and 62 of the tubular insert 38 and the washer-like member 42 as illustrated in FIGS. 2 and 3 to not only firmly hold and trap that portion 48 of the tubular member 31 therebetween to prevent the joint construction 37 from being pulled out of the opening 41 thereof, but also to effectively seal the internal peripheral surface 45 of the tubular member 31 to the tubular insert 38 so as to provide a substantially fluid-tight joint therewith.

The nut 58, when threaded on the threaded portion 57 of the tubular insert 38 in a direction to engage against an outer surface 66 of the end 60 of the washer-like member 42 as illustrated in FIGS. 2 and 3, will cause the washer-like member 42 to be axially moved on the tubular insert 38 toward the end 39 thereof to melchanically clamp the portion 48 of the tubular member 31 between the annular flanges 43 and 62 of the tubular insert 38 and washer-like member 42 to the desired degree to firmly secure the joint construction 37 in the opening 41 of the tubular member 31 for the reasons previously set forth.

Therefore, it can be seen that the various parts of this invention for forming not only the branched hose construction 30, but also for forming the joint construction 37 thereof, can be made in a relatively simple manner to make the branched hose construction 30 by the method of this invention which is now to be described.

When it is desired to make a branched hose construction 30 of this invention, the opening 41 is formed in any suitable manner through one side of the tubular member 31, such as by punching, etc., and is formed of a size that will readily permit the end 39 of the tubular insert 38 to be worked therethrough and have the body portion 49 of the tubular insert 38 extend out of the opening 41 in close relation thereto while the surface means 44 of the annular flange 43 fully mates with the internal peripheral surface 45 of the tubular member 31. Thereafter, the washer-like member 42 is telescoped onto the body portion 49 of the tubular insert 38 so that the surface means 63 thereof is adapted to engage against the external peripheral surface 64 of the tubular member 31. The nut 58 is then threaded onto the threaded portion 57 of the tubular insert 38 and is turned in a direction to compact against the end surface 66 of the washer-like member 42 and force the washer-like member 42 toward the annular flange 43 of the tubular insert 38 to fully compact and compress the portion 48 of the tubular member 31 between the annular flanges 43 and 62 of the tubular insert 38 and washer-like member 42 to effectively provide a fluid-tight joint therewith as previously described. Thereafter, the end 35 of the tubular member 34 is disposed on the end 40 of the tubular insert 38 and is secured thereto by the clamping means 35' in the manner previously described.

Thus, it can be seen that the branched hose construction 30 of this invention can be formed by the method of this invention in a relatively simple and effective manner to provide a branched hose construction 30 for conveying fluid between the tubular members 31 and 34 for purposes well known in the art whereby the operation of the branched hose construction 30 need not be further described.

While the annular flanges 43 and 62 of the tubular insert 38 and washer-like member 42 of this invention have been previously described as merely mechanically clamping the portion 48 of the tubular member 31 therebetween by the restraining nut 58, it is to be understood that a suitable adhesive means can be used on the surface means 44 and 63 of the respective annular flanges 43 and 62 to assist in the securement of the portion 48 therebetween. In addition, while the annular flanges 43 and 62 have been respectively illustrated and described as having annular continuous projection means 47 and 65 on the respective surface means 44 and 63 thereof, it is to be understood that such projection means 47 and 65 could be eliminated or such annular projection means 47 and 65 could comprise a plurality of dimples or teeth disposed in an annular fashion about the flanges 43 and 62 for the previously described securement purposes.

Also, it is to be understood that the tubular insert 38 could be provided with suitable structure that can be readily held during the tightening operation on the nut 58 in order to prevent the tubular insert 38 from turning relative to the tubular member 31 during the nut tightening operation. For example, two slots (not shown) can be formed on the inside diameter of the tubular insert 38 that would mate with suitable structure on a special pneumatic torque wrench that would be utilized for tightening the nut 58 on the tubular insert 38.

It can be seen that it is relatively easy to disassemble the branched hose construction 30 of this invention by merely removing the tubular member 34 from the end 40 of the tubular insert 38, backing off the nut 58 so that the washer-like member 42 can be untelescoped from the tubular insert 38, and then work the tubular insert 31 out of the opening 41 without destroying the tubular member 31, the tubular member 34, or the parts 42 and 38 of this joint construction 37 in the event of improper preparation or positioning of the components during fabrication of the branched hose construction 30 or for connecting a different tubular member to the tubular member 31 as desired.

It is believed that by forming the branched hose construction 30 according to the teachings of this invention, the branched hose construction 30 will be of a strength that is at least equal to the weakest tubular member 31 or 34 thereof and eliminates the requirement of injection molding polymeric material around a metal tube which penetrates the main tubular member wall and which connects to the branched hose as set forth in the aforementioned magazine article of the December 1983 issue of *Automotive Elastomers and Design*, such prior known method being believed to require expensive processing equipment and being highly dependent on hose preparation and positioning of the insert prior to molding. Thus, improper preparation or positioning of components in such prior known method are believed to result in irreversible production of scrap product whereas it is believed that the joint construction of this invention will eliminate costly processing equipment and virtually eliminate irreversible scrap production for the reasons previously set forth.

Another embodiment of the improved branched hose construction of this invention is generally indicated by the reference numeral 30A in FIGS. 5-9 and parts thereof similar to the parts of the branched hose construction 30 previously described are indicated by like reference numerals followed by the reference letter "A".

As illustrated in FIGS. 5-8, it can be seen that the branched hose construction 30A and its associated joint construction 37A is substantially the same as the branched hose construction 30 and its associated joint construction 37 except for the manner of securing the washer-like member 42A to the tubular insert 38A as well as for the configuration of the external peripheral surface 70 of the washer-like member 42A that tends to blend with the external peripheral surface means 64A of the tubular member 31A as well as with the external peripheral surface means 71 of the other tubular member 34A as illustrated. In addition, the projection means 65A on the annular flange 62A of the washer-like member 42A is outwardly spaced from the opening 41A in the tubular member 31A rather than being immediately adjacent thereto as in the washer-like member 42 previously described.

The means for securing the washer-like member 42A in its clamping relation with the tubular insert 38A comprises a tined washer 72 of conventional form which has an outer annular substantially flat ring-like portion 73 provided with a plurality of inwardly angled teeth or tines 74 all of which make a like angle with one side 75 of the washer 72 for a purpose hereinafter set forth.

Figure 7:
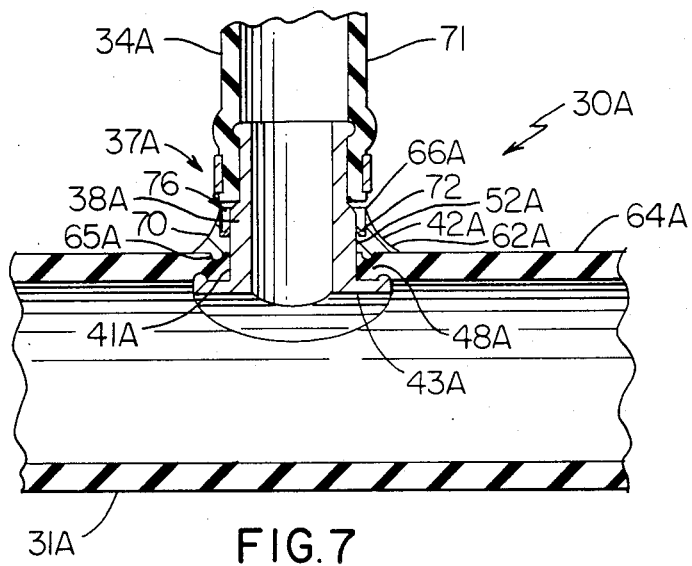
FIG. 7 is a fragmentary cross-sectional view taken on line 7—7 of FIG. 6.
Figure 8:
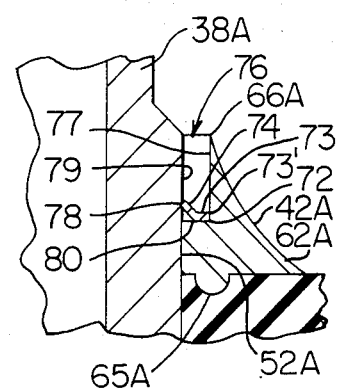
FIG. 8 is an enlarged fragmentary portion of part of the structure illustrated in FIG. 7.
Figure 9:
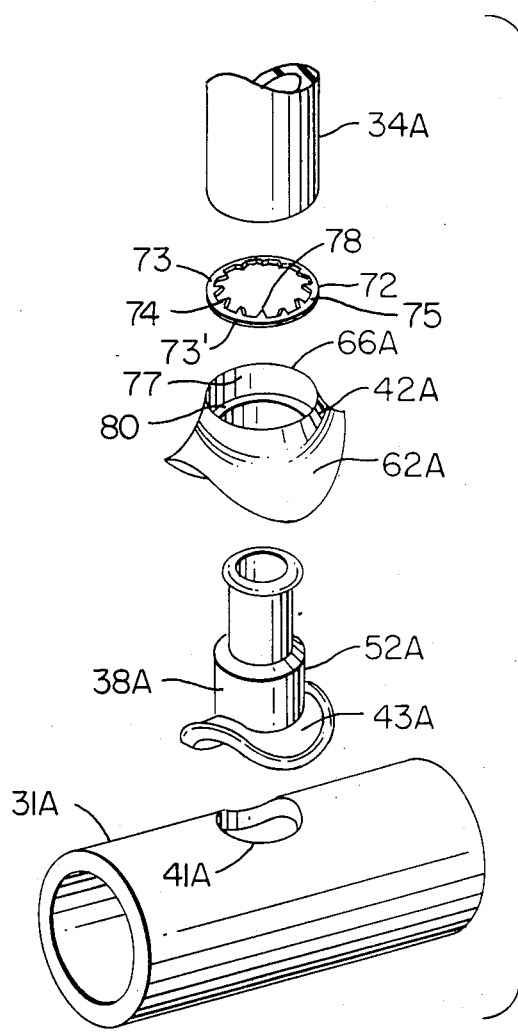
FIG. 9 is a fragmentary, exploded perspective view of the parts of the branched hose construction of FIG. 5.

The end surface 66A of the washer-like member 42A is interrupted by an annular groove means or recess means 76 in which the washer 72 can be received and have its outer peripheral surface 73' disposed in frictionally sliding engagement with the internal peripheral surface 77 of the washer-like member 42A that is defined by the groove means 76 as illustrated in FIGS. 7 and 8.

The length of the tines 74 of the washer 72 have been so selected that the inward tips 78 of the tines 74 frictionally engage against the external peripheral surface 79 of the enlarged body portion 52A of the tubular insert 38A when the washer 72 is telescoped onto the same and pushed downwardly into the groove means 76 of the washer-like member 42A as illustrated in FIG. 8 whereby the tips 78 of the tines 74 dig into the external peripheral surface 79 to tend to retard untelescoping movement of the washer 72 therefrom.

In this manner, when the joint construction 37A is being utilized for making the branched hose construction 30A, the compacting of the washer-like member 42A toward the flange 43A of the tubular insert 38A can take place as a suitable instrument is forcing the washer 72 into the groove means 76 and against the bottom surface 80 thereof as illustrated in FIG. 8 so that when the desired degree of compression of the washer-like member 42A toward the flange 43 of the tubular insert 38 is taking place so as to compress the portion 48A of the tubular member 31A therebetween, releasing of the compacting pressure on the washer 72 causing the washer 72 to remain in its fully compact condition and thereby hold the washer-like member 42A in its fully compacted condition through the action of the tines 74 having their ends 78 digging into the external peripheral surface 49 of the tubular member 38A while the outer peripheral edge 73' of the washer 72 is being held frictionally against the surface 77 of the washer-like member 42A as illustrated in FIG. 8.

Therefore, it can be seen that it is a relatively simple method of this invention to assemble the branched hose construction 30A from the joint construction 37A of this invention by the method of this invention as previously set forth. Also, it can be seen that it is readily simple to disassemble the branched hose construction 30A by using a suitable tool to bend the tines 74 of the washer 72 in a manner well known in the art so as to release the washer 72 from the tubular insert 38A so that the branched hose construction can be disassembled in the manner previously set forth.

Instead of having the tines 74 on the washer 72, or in addition thereto, it is to be understood that the tine action could be provided by the tubular member 38A rather than by the washer 72 to provide the holding effect previously described.

Figure 10:
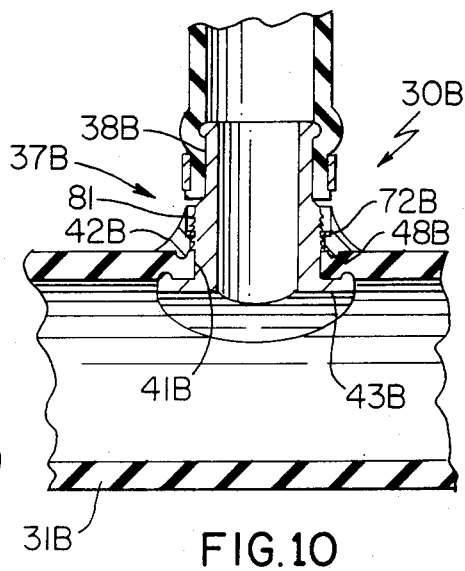
FIG. 10 is a view similar to FIG. 7 and illustrates another embodiment of the improved branched hose construction of this invention.
Figure 11:
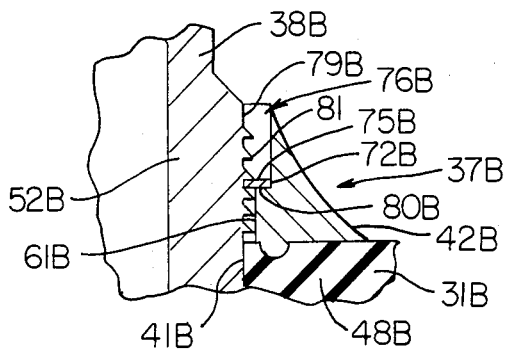
FIG. 11 is a fragmentary, enlarged portion of part of the structure illustrated in FIG. 10.
Figure 12:
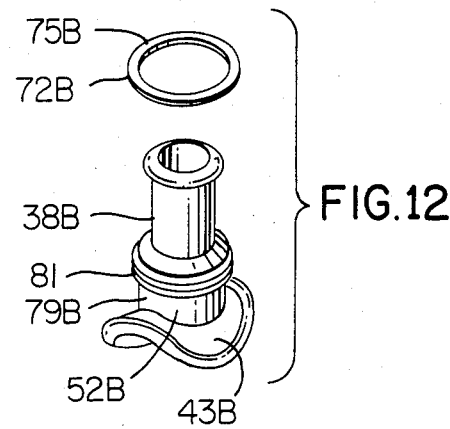
FIG. 12 is an exploded perspective view of two of the parts of the joint construction of the branched hose construction of FIG. 11.

For example, reference is now made to FIGS. 10, 11 and 12 wherein another embodiment of the new improved branched hose construction of this invention is generally indicated by the reference numeral 30B and parts thereof that are similar to parts of the hose constructions 30 and 30A previously described are indicated by like reference numerals followed by the reference letter "B".

As illustrated in FIGS. 11 and 12, the tubular insert 38B has a plurality of outwardly extending annular tines or serrations 81 on the external peripheral surface 79B of the enlarged body portion 52B thereof with the serrations or tines 81 being angled in a direction toward the annular flange 43B thereof so that the same will trap against the top surface 75B of the washer 72B when the same is telescoped in a camming manner down over the same and against the shoulder surface 80B of the washer-like member 42B which is formed in the same manner as the washer-like member 42A previously described.

Thus, the last tine 81 of the tubular insert 38B that is engaged by the top surface 75B of the washer 72B would determine the amount of the compression that the washer-like member 42B will apply onto the portion 48B of the tubular member 31B that is disposed between the washer-like member 42B and the annular flange 43B of the tubular insert 38B when the joint construction 37B is being formed.

In particular, after the tubular insert 38B has been assembled in the opening 41B of the tubular member 31B in the manner previously described, the washer-like member 42B is telescoped onto the tubular insert 38B with the opening 61B thereof clearing the tines or serrations 81 so that the same will compact against the tubular member 31B as illustrated in FIG. 11. Thereafter, the flat washer 72B is telescoped onto the tubular insert 38B into the groove means 76B and forced past the tines 81 in camming manner therewith until the same abuts against the shoulder 80B of the washer-like member 42B and then forces the washer-like member 42B therewith into compressing relation with the portion 48B of the tubular member 31B in the manner previously described until the desired compression is reached so that the last cleared tine 81, in the manner illustrated in FIG. 11, firmly holds the washer 72B in such position and, thus, the portion 48B of the tubular member 31B in the desired compressed or compacted relation between the washer-like member 42B and the annular flange 43B of the tubular insert 38B in the manner previously set forth.

If desired, a cover member in washer-like or ring form can be utilized to cover the cavity or groove means 76 in the washer-like member 42A (as well as in the washer-like member 42B) by being telescopically disposed on the insert 38A after the tined washer 72 has been disposed in the desired position in the washer-like member 42A and before the tubular member 34A is telescoped on the tubular insert 38A whereby such annular cover member will be disposed and held between the tubular member 34A and the washer-like member 38A while closing the cavity or groove 76 thereof.

Therefore, it can be seen that various fastening means can be utilized to fasten the washer-like member and the tubular insert of the joint constructions of this invention together. In fact, such washer-like members and their respective tubular inserts could actually be secured together in the compacting relation thereof by means other than fastening means, such as by welding, soldering, adhesive means, etc.

For example, such other means for securing together the washer-like member and the tubular insert of the joint construction of this invention for forming a branched hose construction of this invention is illustrated in FIGS. 13–16.

In particular, it can readily be seen in FIGS. 13–16 that another embodiment of the improved branched hose construction of this invention is generally indicated by the reference numeral 30C and the parts thereof that are similar to the parts of the branched hose constructions 30, 30A and 30B previously described are indicated by like reference numerals followed by the reference letter "C".

Figure 15:
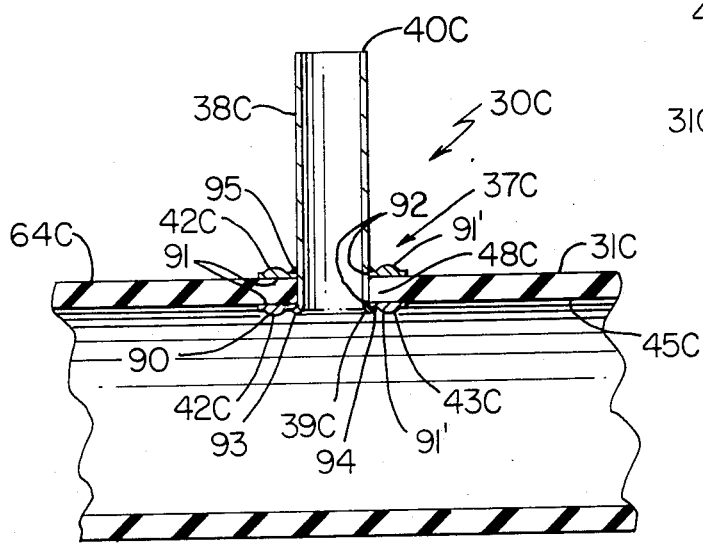
FIG. 15 is a fragmentary cross-sectional view taken on line 15—15 of FIG. 14.
Figure 16:
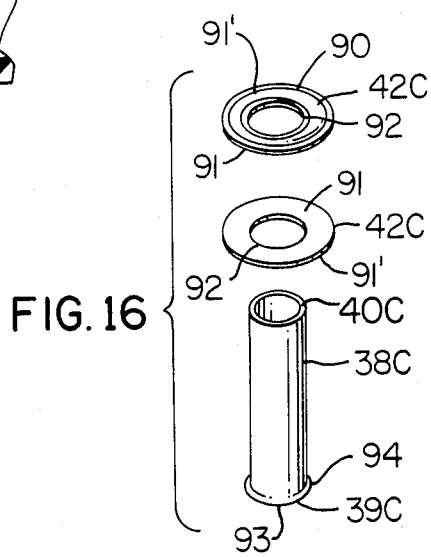
FIG. 16 is an exploded perspective view of the various parts of the joint construction of the branched hose construction of FIG. 13.

The joint construction 37C for forming the branched hose construction 30C of this invention has the tubular insert 38C thereof formed from a substantially straight line metallic tubular section with the outer end 40C being unchanged and the inner end 39C thereof being defined by the annular flange 43C that comprises a separate washer-like member 42C that is identical to the washer-like member 42C that is disposed against the outer peripheral surface 64C of the tubular member 31C as illustrated in FIGS. 15 and 16.

In particular, the washer-like members 42C are formed of metallic material and each has an annular body portion 90 provided with a flat side 91, an arcuate or convex side 91' and a substantially circular opening 92 passing centrally therethrough. In fact such washer-like members 42C can be conventional metallic grommets that are utilized with canvas for awnings, tents and the like.

In any event, the end 39C of the tubular insert 38C is outwardly flared at the reference numeral 93 to define a holding lip 94 which will permit the inner washer-like member 42C when telescoped onto the tubular insert 38C to be held at the end 39C thereof and form the annular flange means 43C as illustrated.

The other washer-like member 42C that is also subsequently telescoped onto the tubular insert 38C after the first washer-like member 42C and the tubular insert 38C have been worked through the opening 41C of the tubular member 31C so as to disposed that flat side 91 of the washer-like member 42C against the internal peripheral surface 45C of the tubular member 31C, is compacted against the external peripheral surface 64C of the tubular member 31C while holding the tubular member 38C in any suitable manner so that the movement of the outer washer-like member 42C toward the inner washer-like member 42C compacts the portion 48C of the tubular member 31C therebetween as the inner washer-like member 42C is being held by the flared lip 94 of the tubular insert 38C. When the outer washer-like member 42C has been compacted toward the inner washer-like member 42C the desired amount, the outer washer-like member 42C is secured to the tubular insert 38C in suitable manner, such as by welding, soldering, etc. and such weld means is indicated by the reference numeral 95 in FIGS. 13, 14 and 15. Of course, care should be taken to avoid any heat damage to the tubular member 31C during such securing operation.

The compacting of the outer washer-like member 42C toward the inner washer-like member 42C with the flat sides 91 thereof respectively facing the external peripheral surface means 64C and internal peripheral surface means 45C of the tubular member 31C causes the portion 48C thereof to be reshaped into substantially the flat arrangement as illustrated in the drawings in order to provide a substantially leak-tight joint between the joint construction 38C and the tubular member 31C for the reasons previously set forth.

Therefore, it can be seen that it is a relatively simple method of this invention to form the joint construction 37C for making the branched hose construction 30C by first merely telescoping one of the washer-like members 42C onto the tubular insert 38C and working that washer-like member 42C and the flared end 39C of the tubular insert 38C through the opening 41C of the tubular member 31C. (Of course, such washer-like member 42C could be secured to the flared end 39C of the tubular insert 38C if desired.) Thereafter, the other washer-like member 42C is telescoped onto the tubular insert 38C so as to have its flat side 91 disposed against the external peripheral surface 64C of the tubular member 31C and through suitable means holding the tubular insert 38C fixed relative to the tubular member 31C while compacting or compressing the outer washer-like member 42C toward the inner washer-like member 42C so as to compress the portion 38C of the tubular member 31C therebetween the desired amount, the outer washer-like member 42C is then welded or soldered to the tubular insert 38C to secure the same thereto. After such weld means or solder means 95 has been hardened so that the outer washer-like member 42C is held firmly in place, the other tubular member 34C can be secured on the end 40C of the tubular insert 38C in any suitable member whereby the resulting joint construction 37C provides the branched hose construction 30C previously described.

While the various branched hose constructions of this invention as previously described each has the tubular insert thereof extending outwardly from its receiving tubular member at a right angle relative thereto, it is to be understood that each tubular insert can be so formed that the same is angled relative to its receiving tubular member at any desired angle relative thereto for making a branched hose construction having a particular configuration thereof.

Figure 17:
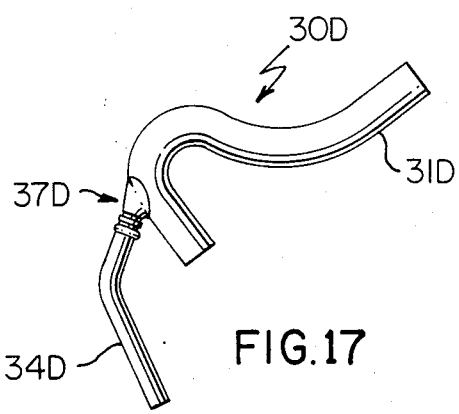
FIG. 17 is a side view of another embodiment of the improved branched hose construction of this invention.
Figure 18:
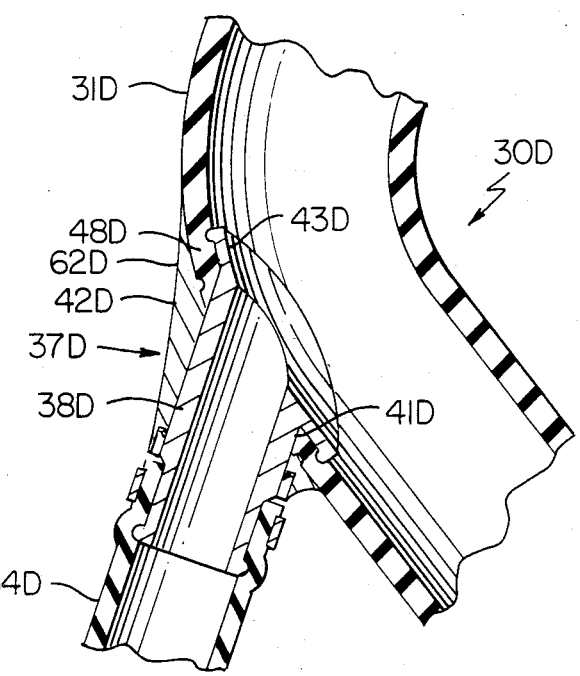
FIG. 18 is an enlarged, fragmentary cross-sectional view of FIG. 17.

For example, another improved branched hose construction of this invention is generally indicated by the reference numeral 30D in FIGS. 17 and 18 and has the joint construction 37D thereof interconnecting a tubular member 31D that is molded in the particular configuration illustrated in FIG. 17 to the other tubular member 34D that is also molded in the particular configuration illustrated in FIG. 17, the joint construction 37D having the tubular insert 38D thereof angled from the tubular member 31D so that the same does not extend out of the opening 41D at a right angle relative thereto.

The parts of the branched hose construction 30D and the joint construction 37D thereof that are similar to the parts of the other branched hose construction and joint constructions of this invention are indicated by like reference numerals followed by the reference letter "D" and it can be seen that the joint construction 37D is substantially the same as the joint construction 37A previously described except that the shapes of the tubular insert 38D and the cooperating washer-like member 42D therefor have been changed to provide for the particular angled relationship between the tubular insert 38D and the portion 48D of the tubular member 31D that is held between the annular flange means 43D and 62D of the tubular insert 38D and washer-like member 42D. However, the method of making the joint construction 37D is substantially the same as the method of making the joint construction 37A previously described and therefore will not be repeated.

Also, while the branched hose constructions of this invention have been previously described as having only one branch to the main branch thereof, it is to be understood that a plurality of branches could be interconnected to a single branch by the joint constructions of this invention.

Figure 19:
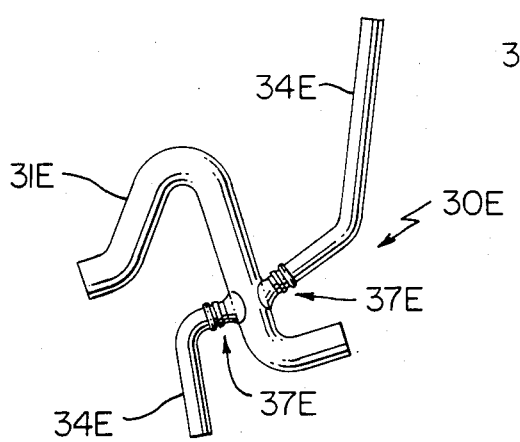
FIG. 19 is a view similar to FIG. 17 and illustrates another embodiment of the improved branched hose construction of this invention.

For example, reference is now made to FIG. 19 wherein another improved branched hose construction of this invention is generally indicated by the reference numeral 30E and it can be seen that two branches 34E of different molded configurations are interconnected to the tubular member 31E that has its own molded configuration by respective joint constructions 37E of this invention, the joint constructions 37E being any one of the joint constructions of this invention previously described or a combination thereof as desired.

Figure 20:
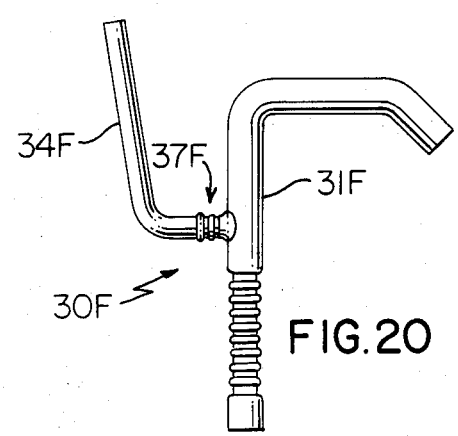
FIG. 20 is a view similar to FIG. 17 and illustrates another embodiment of the improved branched hose construction of this invention.
Figure 13:
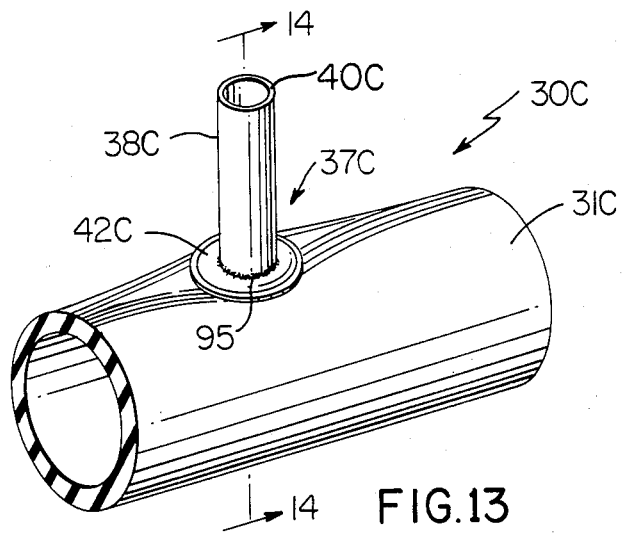
FIG. 13 is a view similar to FIG. 1 and illustrates another embodiment of the improved branched hose construction of this invention.
Figure 14:
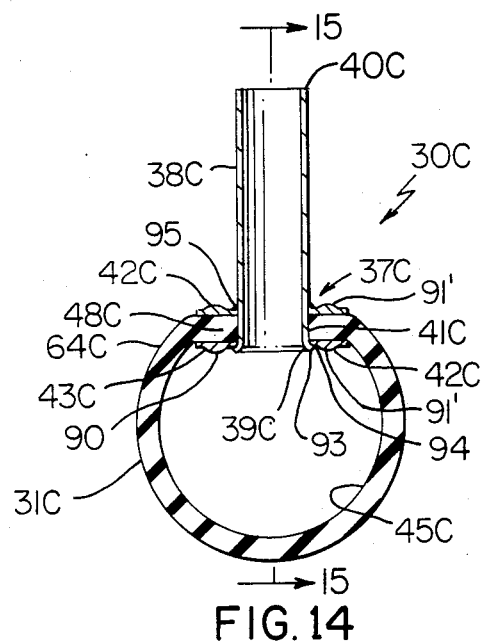
FIG. 14 is an enlarged, fragmentary cross-sectional view taken on line 14—14 of FIG. 13.

Another improved branched hose construction 30F of this invention is illustrated in FIG. 20 and has the joint construction 37F interconnecting the main tubular member 31F having one molded configuration to the branch tubular member 34F having its own particular molded configuration.

Therefore, it can be seen that various shapes can be provided for the tubular members of this invention and the same can still be joined together by a joint construction of this invention to form a branched hose construction of this invention in any of the manners previously set forth as the tubular insert and its cooperating washer-like member can be readily shaped to produce the branched hose construction in its desired shape.

Also, while the various embodiments of this invention as previously described are made by compacting an outer part of the joint construction toward a part thereof that is disposed inside one of the tubular members, it is to be understood that the outer part could be fastened to the tubular insert and a part of the joint construction that is disposed inside the cooperating tubular member can then be compacted toward the outer secured part to compact or clamp an annular portion of that tubular member therebetween with the resulting branched hose construction being substantially the same as the branched hose construction previously set forth.

For example, such a branched hose construction is generally indicated by the reference numeral 30G in FIG. 21 and parts thereof similar to the branched hose construction 30C illustrated in FIGS. 13-16 will be indicated by like reference numerals followed by the reference letter "G".

As illustrated in FIG. 21, the branched hose construction 30G is substantially identical to the branched hose construction 30C of FIG. 15 except that the branched hose construction 30G is formed by a different unique method of this invention than the unique method previously described in connection with FIGS. 13-16.

In particular, the tubular insert 38G is initially provided with unflared opposed ends 96 and 97 so that the tubular insert 38G is uniform throughout the length thereof.

Thereafter, the washer-like member 42G is telescoped onto the end 97 of the tubular insert 38G to a predetermined position thereon and is soldered thereto by the solder means 95G so that the end 97 of the tubular insert 38G extends a certain amount beyond the flat side 91G of the secured washer-like member 42G. In this manner, the end 97 of the tubular insert 38G will be disposed beyond the internal peripheral surface 45G of the tubular member 31G when the end 97 is inserted through the opening 41G formed therethrough in the manner illustrated in FIG. 24 and the flat side 91G of the washer-like member 42G is engaging against the external peripheral surface 64G of the tubular member 31G.

The inside washer-like member 42G is then inserted into the tubular member 31G and is assembled on the unflared end 97 of the tubular insert 38G so that the flat side 91G of the washer-like member 42G will be disposed against the internal peripheral surface 45G of the tubular member 31G in the manner illustrated in FIG. 25.

Thereafter, the end 97 of the tubular insert 38G is outwardly flared to define the lip 94G with compacts against the side 91'G of the inside washer-like member 42G and compacts the same toward the previously secured outside washer-like member 42G so as to clamp the annular portion 48G of the tubular member 31G between the facing sides 91G of the grommets or washer-like members 42G and 42G to seal closed the opening 41G and form the branched hose construction 30G as illustrated in FIG. 21 whereby it can be seen that the resulting branched hose construction 30G is substantially the same as the resulting hose construction 30C previously set forth.

Any suitable means can be utilized to flare the end 97 of the tubular insert 38G after the end 97 of the tubular insert 38G has been inserted into the opening 41G and the washer-like member 42G has been added thereto in the manner illustrated in FIG. 25. For example such flaring can be provided by inserting suitable flaring tooling equipment through either end of the tubular member 31G that are respectively indicated by the reference numerals 98 and 99 in FIG. 21. However, it is to be understood that such tooling for flaring could be inserted through the tubular opening 100 passing through the tubular insert 38G if desired.

In particular, such flaring can be accomplished with a special tool which would hold the tubular insert 38G while pressing a conical portion into the end 97 of the tubular insert 38G to flare the same at the reference numeral 101 and thereby form the lip 94G while compacting the inside washer-like member 42G toward the previously secured washer-like member 42G as previously set forth.

Therefore, it can be seen that the other embodiments of the branched hose construction of this invention could likewise be modified so that the same could be made by the method of this invention wherein the tubular insert has the outer compacting portion thereof presecured thereto and the tubular insert will be inserted through the opening in the tubular member to thereafter have an annular flange means formed on the tubular insert inside the tubular member so as to compact the tubular member between that formed annular flange means and the previously secured outer washer-like member as previously described.

In fact, it may be found that the annular flange means can comprise just the flared end portion of the inserted tubular insert such as the flared portion 94G illustrated in FIG. 21 without utilizing an inside washer-like member 42G, if desired.

Also, while the methods of this invention previously described for the embodiments of FIGS. 13-16 and FIGS. 21-25 cause the tubular members 31C and 31G to become flattened between the cooperating washer-like member 42C and 42G as the same are being disposed in compacting relation therewith, it is to be understood that the tubular members 31C and 31G could be preflattened in any suitable manner adjacent the openings 41C and 41G thereof before the tubular inserts 38C and 38G are inserted therein.

As previously set forth, the openings through the tubular members that are to receive the tubular inserts of this invention can be formed in such tubular members in any suitable manner.

For example, a cutting plug could be inserted into the tubular member, using a flexible rod, to serve as a stop for a hole punch that could be used to punch the hole or opening through the tubular member. After the opening is so punched, the tubular insert is installed and if the tubular insert comprises polymeric material, installation can be made easier if a rigid rod is placed in the tubular insert and used as a handle. A special machine might be designed to facilitate such installation and adhesive could be utilized on the portion of the inserted flange which contacts the inside surface of the tubular member. If the adhesive is properly selected, it might also serve as a lubricant for installation of the tubular insert into the opening of the respective tubular member.

Therefore, it can be seen that this invention provides improved methods of making a branched hose construction.

While the methods of this invention now preferred have been illustrated and described as required by the Patent Statute, it is to be understood that other method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a branched hose construction comprising the steps of providing a first tubular member having opposed ends, providing a second tubular member having opposed ends, forming said first tubular member to have an opening therein intermediate said opposed ends thereof, providing a joint construction that comprises a tubular insert having opposed ends, joining one of said ends of said second tubular member to said opening by having one end of said tubular insert disposed through said opening and the other end thereof interconnected to said one end of said second tubular member whereby said tubular members are in fluid communication with each other through said tubular insert and said second tubular member branches outwardly from said first tubular member, forming said joint construction to further comprise a washer-like member, telescoping said washer-like member on said tubular insert, mechanically clamping said one tubular member between said washer-like member and said one end of said tubular insert completely around said opening thereof, and securing said washer-like member to said tubular insert, the step of securing said washer-like member to said tubular insert taking place after the step of disposing said one end of said tubular insert through said opening of said one tubular member, the improvement wherein said fastening member comprises an annular internally tined washer frictionally engaging said tubular insert and engaging and compacting said washer-like member toward said one end of said tubular insert.

2. In a method of making a branched hose construction comprising the steps of providing a first tubular member having opposed ends, providing a second tubular member having opposed ends, forming said first tubular member to have an opening therein intermediate said opposed ends thereof, providing a joint construction that comprises a tubular insert having opposed ends, joining one of said ends of said second tubular member to said opening by having one end of said tubular insert disposed through said opening and the other end thereof interconnected to said one end of said second tubular member whereby said tubular members are in fluid communication with each other through said tubular insert and said second tubular member branches outwardly from said first tubular member, forming said joint construction to further comprise a washer-like member, telescoping said washer-like member on said tubular insert, mechanically clamping said one tubular member between said washer-like member and said one end of said tubular insert completely around said opening thereof, and securing said washer-like member to said tubular insert, the step of securing said washer-like member to said tubular insert taking place after the step of disposing said one end of said tubular insert through said opening of said one tubular member, the improvement wherein said fastening member comprises an annular washer interlocking with external serration means of said tubular insert and engaging and compacting said washer-like member toward said one end of said tubular insert.

3. In a method of making a branched hose construction comprising the steps of providing a first tubular member having opposed ends, providing a second tubular member having opposed ends, forming said first tubular member to have an opening therein intermediate said opposed ends thereof, providing a joint construction that comprises a tubular insert having opposed ends, joining one of said ends of said second tubular member to said opening by having one end of said tubular insert disposed through said opening and the other end thereof interconnected to said one end of said second tubular member whereby said tubular members are in fluid communication with each other through said tubular insert and said second tubular member branches outwardly from said first tubular member, forming said joint construction to further comprise a washer-like member, telescoping said washer-like member on said tubular insert, mechanically clamping said one tubular member between said washer-like member and said one end of said tubular insert completely around said opening thereof, and securing said washer-like member to said tubular insert, the step of securing said washer-like member to said tubular insert taking place after the step of disposing said one end of said tubular insert through said opening of said one tubular member, the improvement comprising the steps of forming an annular recess in said washer-like member, and disposing said fastening member in said annular recess.

4. In a method of making a branched hose construction comprising the steps of providing a first tubular member having opposed ends, providing a second tubular member having opposed ends, forming said first tubular member to have an opening therein intermediate said opposed ends thereof, providing a joint construction that comprises a tubular insert having opposed ends, joining one of said ends of said second tubular member to said opening by having one end of said tubular insert disposed through said opening and the other end thereof interconnected to said one end of said second tubular member whereby said tubular members are in fluid communication with each other through said tubular insert and said second tubular member branches outwardly from said first tubular member, forming said joint construction to further comprise a washer-like member, telescoping said washer-like member on said tubular insert, mechanically clamping said one tubular member between said washer-like member and said one end of said tubular insert completely around said opening thereof, securing said washer-like member to said tubular insert, and forming said one end of said tubular insert with an annular flange, the improvement wherein said step of forming said one end of said tubular insert with an annular flange takes place after the step of disposing said one end of said tubular insert through said opening of said one tubular member.

5. A method as set forth in claim 4 wherein said step of forming said one end of said tubular insert with an annular flange comprises the step of securing an annular flange member to said one end, said step of clamping comprising the step of clamping said one tubular member between said washer-like member and said annular flange member.

6. A method as set forth in claim 5 wherein said step of securing an annular flange member to said one end comprises the step of telescoping said annular flange member onto said one end of said tubular insert, and, thereafter outwardly flaring said one end to overlap said annular flange member and thereby trap said annular flange member between said flared end and said one tubular member.

7. A method as set forth in claim 6 wherein said step of flaring comprises the step of mechanically clamping said one tubular member between said washer-like member and said one end of said tubular insert.

8. A method as set forth in claim 5 and including the step of forming said annular flange member to be substantially the same as said washer-like member.

9. In a method of making a branched hose construction comprising the steps of providing a first tubular member having opposed ends, providing a second tubular member having opposed ends, forming said first tubular member to have an opening therein intermediate said opposed ends thereof, providing a joint construction that comprises a tubular insert having opposed ends, joining one of said ends of said second tubular member to said opening by having one end of said tubular insert disposed through said opening and the other end thereof interconnected to said one end of said second tubular member whereby said tubular members are in fluid communication with each other through said tubular insert and said second tubular member branches outwardly from said first tubular member, forming said joint construction to further comprise a washer-like member, telescoping said washer-like member on said tubular insert, mechanically clamping said one tubular member between said washer-like member and said one end of said tubular insert completely around said opening thereof, and securing said washer-like member to said tubular insert, the improvement wherein the step of securing said washer-like member to said tubular insert takes place before the step of disposing said one end of said tubular insert through said opening of said one tubular member, forming said one end of said tubular insert with an annular flange by securing an annular flange member to said one end, said step of clamping comprising the step of clamping said one tubular member between said washer-like member and said annular flange member, the step of securing an annular flange member to said one end comprising the step of telescoping said annular flange member onto said one end of said tubular insert, and, thereafter outwardly flaring said one end to overlap said annular flange member and thereby trap said annular flange member between said flared end and said one tubular member.

10. A method as set forth in claim 9 wherein said step of flaring comprises the step of mechanically clamping said one tubular member between said washer-like member and said one end of said tubular insert.

* * * * *